United States Patent [19]

Kopp

[11] 4,390,575
[45] Jun. 28, 1983

[54] MULTICHANNELED DIFFUSION DEVICE

[75] Inventor: Clinton V. Kopp, Barrington, Ill.

[73] Assignee: Baxter Travenol Laboratories, Inc., Deerfield, Ill.

[21] Appl. No.: 326,740

[22] Filed: Dec. 2, 1981

[51] Int. Cl.³ .................. B01D 13/00; B01D 13/02; B01D 13/04; B01D 39/16
[52] U.S. Cl. ............................. 428/36; 156/174; 156/179; 156/187; 156/188; 156/191; 156/247; 156/250; 156/256; 156/269; 156/291; 204/296; 204/301; 210/500.2; 428/114; 428/162; 428/166; 428/172; 428/195; 428/294
[58] Field of Search ...................... 204/296, 301; 210/500.2; 428/36, 114, 162, 166, 172, 195, 294; 156/174, 179, 291, 187, 188, 191, 247, 250, 256, 269 S

[56] References Cited

U.S. PATENT DOCUMENTS

| 2,735,812 | 2/1956 | Van Hoek | 204/301 |
| 2,758,083 | 8/1956 | Van Hoek et al. | 204/301 |
| 3,013,100 | 12/1961 | Mendelsohn et al. | 204/296 |
| 3,219,567 | 11/1965 | Lacey | 204/301 |
| 3,565,741 | 2/1971 | Jaran | 428/294 |
| 3,578,173 | 5/1971 | Streeton | 428/166 |
| 3,598,689 | 8/1971 | Feffer et al. | 428/294 |
| 3,616,930 | 11/1971 | Muir | 210/500.2 |
| 3,707,433 | 12/1972 | Clough et al. | 428/294 |
| 3,736,202 | 5/1973 | Sorenson | 156/174 |
| 4,173,537 | 11/1979 | Newhart | . |
| 4,176,069 | 11/1979 | Metz et al. | . |
| 4,191,627 | 3/1980 | Specht | 204/296 |

FOREIGN PATENT DOCUMENTS

| 1176045 | 8/1964 | Fed. Rep. of Germany | 428/294 |
| 1200986 | 12/1959 | France | 156/179 |

Primary Examiner—James C. Cannon
Attorney, Agent, or Firm—Paul C. Flattery; Garrettson Ellis; Daniel D. Ryan

[57] ABSTRACT

A plurality of lengths of fibers may be disposed into a sheet-like array with the fibers being spaced from each other and defining channels therebetween. A pair of membranes is brought into adhering relation with opposed sides of the fibers of the sheet-like array to form a multichanneled flow device.

24 Claims, 5 Drawing Figures

MULTICHANNELED DIFFUSION DEVICE

TECHNICAL FIELD

This application generally relates to semipermeable, multichanneled membrane assemblies and the method for making them.

DESCRIPTION OF THE PRIOR ART

Semipermeable membranes are used in a large variety of diffusion devices of known design, for example, membrane oxygenators for blood, dialyzers for blood, membrane plasmapheresis devices, reverse osmosis devices, and others. In these devices it is generally preferred to provide a large plurality of flow channels, particularly in devices where blood is processed, with the blood being divided to flow through the large number of small flow channels so that the blood is exposed to a large surface area of semipermeable membrane, even though the dimensions of each flow channel may be small.

To accomplish this, bundles of fibers of semipermeable membrane may be mounted within a tubular housing using conventional potting techniques, such as those disclosed in U.S. Pat. Nos. 3,492,698; 3,442,002; and 4,227,295. To improve the handling of particularly fragile fibers and to protect them, the hollow fibers of semipermeable membrane may be carried on a sheet member by adhesion at their ends to the sheet member. The sheet member is then loosely rolled inwardly upon itself on an axis to define a typically spiral configuration in cross section, as disclosed in Lee et al. application Ser. No. 278,912, filed June 29, 1981.

The above cited references, and many more besides, involve the manufacture of diffusion devices using preformed capillary tubing made of semipermeable membrane material. However, such capillary tubing is expensive, difficult to make in proper dimensions and of consistent quality, and sometimes difficult to purchase due to uncertainties of supply.

Multichanneled diffusion devices have also been proposed to be extruded, for example as a single block or sheet of semipermeable membrane material having separate, parallel flow channels defined therethrough. See, for example, Metz et al. U.S. Pat. No. 4,176,069 as well as the application of Clinton V. Kopp et al. Ser. No. 133,151, filed Mar. 24, 1980, now abandoned.

In accordance with this present invention, a simplified, multichanneled flow device is provided, which preferably serves as a multichanneled, semipermeable membrane for use in various diffusion operations such as those described above. The multichanneled flow device of this invention can be manufactured without the use of preformed capillary tubing or complex, multichanneled, extruded structures. Instead, simple, solid fibers and sheet membrane may be used in the manufacturing method of this invention, resulting in a cost-saving simplification of the manufacturing operation, when one considers the difficulties and consequent expense of manufacturing capillary tubing and complex extruded members.

The resulting flow device has flow channels which do not separate from each other on pressurization, since they are held together in a unitary structure. Thus the resulting flow channels tend to remain in more orderly arrangement during use in a diffusion device, and the formation of shunting channels of reduced flow resistance through the device is reduced.

DESCRIPTION OF THE INVENTION

In accordance with this invention a plurality of lengths of fibers are disposed into a sheet-like array, with the fibers being spaced from each other to define channels therebetween. One then brings a pair of membranes into adhering relation with opposed sides of the fibers of the sheet-like array, to form the multichanneled flow device. Each individual channel is defined between adjacent fibers, with the channel being isolated and confined between the pair of membranes which are adhered to the fibers of the sheet-like array.

Preferably the lengths of fibers are disposed parallel to each other, and are from 10 to 200 microns in diameter, while the spacing between the fibers may preferably be 50 to 500 microns. Thus the dimensions of the flow channels through the multichanneled flow device may be comparable with the dimensions of flow channels in known blood dialyzers, oxygenators, and membrane plasmapheresis devices.

It is also generally preferred for the spacing of the lengths of fibers from each other to be uniform, and for the membranes to constitute an appropriate semipermeable membrane for the particular purpose contemplated. In other words, for the oxygenation of blood the semipermeable membrane may be, for example, silicone sheets of microporous, hydrophobic plastic materials such as polypropylene or polytetrafluoroethylene, which materials are commercially available and known for use in blood oxygenation. Known microporous polypropylene membranes or the like may be used in this invention if it is desired to produce a membrane plasmapheresis device. With respect to dialysis, the cellulose-based membranes used for that purpose adhere with difficulty to plastic materials, but may be bonded to cellulosic fibers assembled in a sheet-like array if desired.

The specific fibers which may be used may be plastic fibers, for example polyethylene or polypropylene for sealing to the polypropylene membranes, or they may be of any other desired material compatible for sealing with the desired membranes either with or without the presence of an adhesive. For example, extruded, incompletely cured silicone rubber fibers may be used with the silicone rubber membranes, with the silicone being cured after coming into contact with the membranes for improved adhesion. For example, RTV silicone could be used.

Cotton, rayon, or other natural fibers could be used for adhesion to cellulose membrane, for example by using an appropriate adhesive.

It may also be desired for the fibers to have sufficient stiffness so that the flow device tends to be self-supporting, and not a completely limp device. This provides advantages in the manufacturing techniques for assembling the multichanneled flow devices of this invention into a functional diffusion device.

As one method of assembly of the multichanneled flow devices of this invention, lengths of fibers may be disposed in a sheet-like array by winding the fibers about a drum, with the wound fiber loops on the drum being spaced from each other. A band of adhesive-sealant may be placed transversely across the wound fiber loops. Following this, one cuts along the longitudinal center line of the band to sever the fiber loops into a strip of fibers having a portion of the band of adhesive-sealant extending across the entire width of the strip at each end thereof. Thus the portions of the band of adhesive-sealant may be stretched to orient the length of fibers into generally parallel relation with predetermined spacing between them. The pair of membranes may then be applied into adhering relation with the sheet-like array of fibers to form the multichannel flow device. The techniques of application may include heat sealing techniques or the use of adhesives, or solvent sealing in appropriate cases. After this the ends may be cut to remove the adhesive bands, if desired.

In the instance where the fibers are made of a plastic susceptible to RF sealing and the membranes are not, the membranes may be conveniently sealed together by simply pressing them together with the sheet-like array of fibers between them, and heating and at least partially melting the fibers by the RF sealing to form a bond along essentially their entire lengths of contact with the membrane, with the flow channels defined therebetween.

Another technique which may be used to assemble the multichanneled flow device of this invention comprises disposing lengths of fibers into a sheet-like array by winding the fiber about a drum which carries one of the pairs of membranes, with the wound fiber loops on the drum being spaced from each other and overlying the one membrane carried on the drum. One then applies the other of the membranes to the sides of the lengths of wound fibers opposed to the one membrane, under conditions to cause adherence of the lengths of fibers to the other of said membranes. Adhesive or heat sealing techniques as described above may be used to cause the adhesion.

Thereafter, the fibers and adhered membranes may be removed from the drum to form the multichanneled flow device. As in the previous method, a transverse band of adhesive may be used, with the cutting of the fibers taking place down the middle of the band of adhesive to provide a portion of the adhesive band at each end of the resulting strip.

The adhesive band may be made from a hot melt adhesive, for example, EVA plastic or other known hot melt formulations adhesively compatible with the membranes and fibers of the multichanneled flow device.

DESCRIPTION OF SPECIFIC EMBODIMENT

Figure 1:
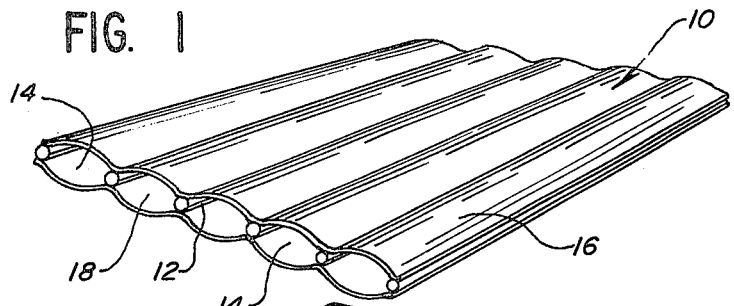
FIG. 1 is a perspective view of a multichanneled flow device in accordance with this invention.
Figure 2:
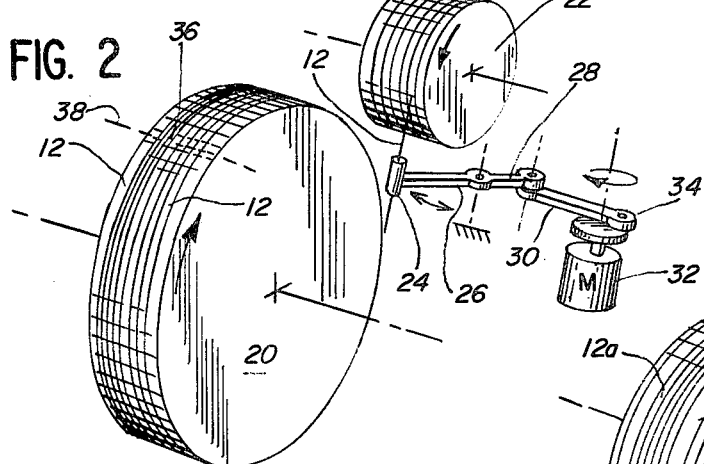
FIG. 2 is a perspective view of one step in a method of assembling the flow device of this invention.
Figure 3:
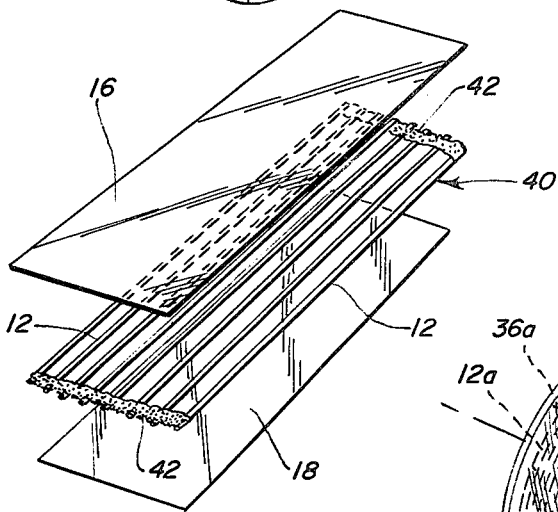
FIG. 3 is a perspective view of a subsequent step in the method illustrated in FIG. 2 in the assembly of the flow device of this invention.

In accordance with FIGS. 1-3, a multichanneled flow device 10 is disclosed, which comprises a plurality of lengths of fibers 12 disposed in sheet-like array with the fibers being spaced from each other to define channels 14 therebetween.

A pair of membranes 16, 18 are each placed in adhering relationship, preferably along the entire length of each of the fibers 12, and respectively on opposed sides of the fibers so that a device having a plurality of flow channels 14, each being defined between and separated by fibers 12, passing between the membranes 16, 18, is defined.

The flow device of FIG. 1 described above may be of varying dimensions, particularly as previously described. The fibers 12 may preferably be made of a polyolefin such as polyethylene or polypropylene. The membranes 14, 16 may, for example, be a microporous polypropylene material, for example, suitable for effecting membrane plasmapheresis of blood.

FIG. 2 shows a step of one manufacturing process of the device of this invention. The various lengths of fibers 12 are wound onto a rotating drum 20, the fiber 12 being provided from a rotating spool 22 and passing through sleeve or ring 24, the position of which may be controlled by pivot arms 26, 28, 30, which may be operated by control motor 32 which rotates the near end 34 of arm 30 so that sleeve 24 moves back and forth as desired, thus controlling the lay-down position of each individual coil of fiber 12 as drum 20 is rotated. Hence, the fibers may be deposited in a uniform parallel manner on the drum 20.

After the fibers have been so deposited in parallel, laterally spaced relationship to each other, a band of hot melt adhesive 36 may be placed transversely across the wound array of fibers 12. After the hot melt adhesive has cooled, it may be longitudinally cut along its center line 38 (shown in dotted lines) so that the sheet-like array 40 (FIG. 3) of fibers 12 can be removed from drum 20 with portion 42 of the band 36 of adhesive sealant extending across the entire width of the band at each end thereof. A suitable adhesive sealant is a known EVA-type hot melt material, for example.

Following this, as also shown in FIG. 3, the pair of membranes 16, 18 may be respectively adhered to opposed sides of the fibers 12 of sheet-like array 40 to result in the device that is specifically shown in FIG. 1. This may be done by solvent sealing, for example, by wetting the thermoplastic fibers 12 with a solvent such as cyclohexane or methylisobutylketone, and then pressing membranes 16, 18 firmly into adhering relation with fibers 12. This is an effective adhesion technique when polyethylene or polypropylene fibers 12 are used and when the membranes 16, 18 are made of microporous polypropylene, as may be the case in blood oxygenation or membrane plasmapheresis of blood, because the polyolefin fibers 12 may be readily solvent sealed to the polypropylene membranes 16, 18. In other circumstances, conventional adhesives may be used, or other solvents. As stated above, radio frequency sealing techniques may be used in some circumstances.

The resulting membrane multichanneled flow device may then be installed in a diffusion device of conventional design. Long lengths of the membrane device may be coiled about a core, with spacer screening positioned between the various coils of the flow device of this invention. Alternatively, a stack of lengths of the flow device of this invention may be utilized as well, typically separated by spacer screening or another type of spacer.

Figure 4:
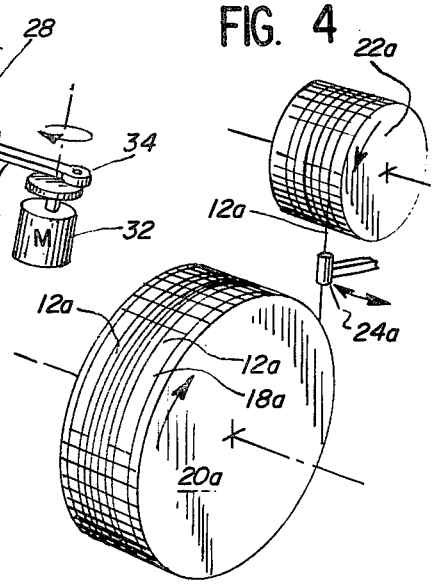
FIG. 4 is a perspective view of a step in another method of assembling the flow device of this invention.

Referring to FIG. 4, a modified assembly technique is illustrated. The lengths of fiber 12a may be wound on drum 20a in a manner similar to that described with respect to FIG. 2, with control sleeve 24a being moved back and forth in a manner to control the placement of the individual loops of fiber 12a on drum 20a in the manner desired. As before, the fiber 12a is wound off of spool 22a.

Figure 5:
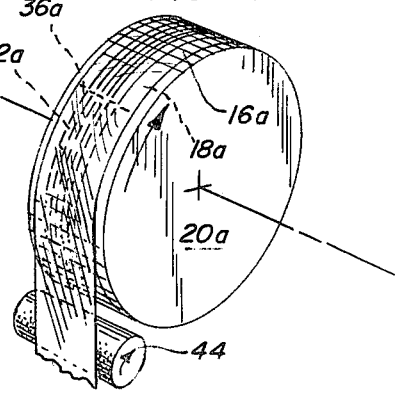
FIG. 5 is a perspective view of a subsequent step in the assembly method illustrated in FIG. 4.

A difference in this particular embodiment is that drum 20a already carries membrane 18 wound about its periphery, so that the loops of fibers 12a are wound on top of membrane 18. Following this, as shown in FIG. 5, the winding may be terminated, adhesive sealant 36a may be applied, and then another winding of membrane 16a may be placed on top of the winding of drum 20a. In this instance, a glue or solvent may be applied from applicator roller 44 to the inside surface of membrane 16a to selectively cause adherence to fibers 12a. This is particularly desirable in the event that the glue does not provide good adhesion between the respective membranes 16a, 18a but does provide good adhesion between fiber loops 12a and their respective membranes.

In the alternative, the fiber 12a may be wetted with adhesive or solvent before being wound on the drum 20a, followed by the winding of the second membrane 16a, with resulting adhesion between the membranes and the loops of fiber.

Following the application of a band of adhesive sealant 36a and the final winding step to apply membrane 16a, adhesive sealant 36a may be cut in the previously described manner to provide the device of this invention.

The above has been ordered for illustrative purposes only, and is not intended to limit the scope of the invention of this application, which is as defined in the claims below.

That which is claimed is:

1. The method of disposing a plurality of lengths of fibers into a sheet-like array with the fibers being spaced from each other to define channels therebetween, and bringing a pair of semipermeable membranes into adhering relation with opposed sides of the fibers of said sheet-like array, to form a multichanneled flow device.

2. The method of claim 1 in which said lengths of fibers are disposed parallel to each other.

3. The method of claim 1 in which said lengths of fibers are from 10 to 200 microns in diameter.

4. The method of claim 3 in which the spacing between said fibers is 50 to 500 microns.

5. The method of claim 1 in which the spacing of the fibers from each other is uniform.

6. The method of claim 1 in which membranes are made of a relatively flexible, limp material, said fibers have sufficient stiffness to cause said flow device to be self-supporting.

7. The method of claim 1 in which said fibers are solid in cross section.

8. The method of claim 1 in which said fibers are adhered to said membranes along essentially their entire lengths of contact with said membranes.

9. The method of claim 1 in which said lengths of fibers are disposed into a sheet-like array by winding said fibers about a drum with the wound fiber loops on said drum being spaced from each other; placing a band of adhesive-sealant transversely across said wound fiber loops; and cutting along the length of said band to sever said fiber loops into a strip of fibers having a portion of the band of adhesive-sealant extending across the entire width of said band at each end thereof.

10. The method of claim 1 in which said lengths of fibers are disposed into a sheet-like array by winding said fibers about a drum which carries one of said pair of membranes, with the wound fiber loops on the drum being spaced from each other and overlying said one membrane, under conditions to cause said fiber loops to adhere to said one membrane, and applying the other of said membranes to the sides of said lengths of wound fiber loops opposed to the one membrane under conditions to cause adherence of the lengths of fibers to the other of said membranes, and thereafter removing said fibers and adhered membranes from the drum.

11. The method of disposing a plurality of lengths of parallel fibers into a sheet-like array with the fibers being spaced from each other to define channels therebetween said lengths of fibers being from 10 to 200 microns in diameter and spaced from 50 to 500 microns apart, and bringing a pair of semipermeable membranes into adhering relation with opposed sides of the fibers of said sheet-like array, to form a multichanneled flow device.

12. The method of claim 11 in which the spacing of the fibers from each other is essentially uniform, said fibers being solid in cross section.

13. The method of claim 12 in which said fibers have sufficient stiffness to cause said flow device to be self-supporting.

14. The method of claim 13 in which said fibers are adhered to their membranes along essentially their entire lengths of contact with said membranes.

15. The method of claim 14 in which said lengths of fibers are disposed into a sheet-like array by winding said fibers about a drum with the wound fiber loops on said drum being spaced from each other; placing a band of adhesive-sealant transversely across said wound fiber loops; and cutting along the length of said band to sever said fiber loops into a strip of fibers having a portion of the band of adhesive-sealant extending across the entire width of said strip at each end thereof.

16. A multichanneled flow device which comprises a plurality of lengths of fibers in sheet-like array, with the fibers being spaced from each other to define channels therebetween, and a pair of semipermeable membranes positioned in adhering relation with opposed sides of the fibers of said sheet-like array.

17. The flow device of claim 16 in which said lengths of fibers are solid in cross section and disposed parallel to each other.

18. The sheet-like array of claim 16 in which said lengths of fibers are from 10 to 200 microns in diameter.

19. The sheet-like array of claim 16 in which the spacing between said fibers is 50 to 500 microns.

20. The flow device of claim 16 in which the spacing of the fibers from each other is uniform.

21. The flow device of claim 16 in which said membranes are made of a relatively flexible material, and said fibers have sufficient stiffness to cause said flow device to be self-supporting.

22. The flow device of claim 16 in which said fibers are adhered to said membranes along essentially their entire lengths of contact with said membranes.

23. A multichanneled flow device which comprises a plurality of parallel fibers positioned in sheet-like array, with the fibers being spaced from each other by substantially uniform spacing to define channels therebetween, said fibers being from 10 to 200 microns in diameter and spaced apart from 50 to 500 microns, and semipermeable membranes positioned in adhering relation with opposed sides of the fibers of said sheet-like array along essentially the entire lengths of said membranes.

24. The flow device of claim 23 in which said fibers are solid in cross section and the spacing of the fibers from each other is uniform.

* * * * *